United States Patent [19]

Röhm

[11] 4,102,539
[45] Jul. 25, 1978

[54] POWER-ACTUATED CHUCK, ESPECIALLY FOR TURNING MACHINES SUCH AS LATHES

[76] Inventor: Günter Horst Röhm, Heinrich-Röhm-Str. 50, Sontheim, Fed. Rep. of Germany, 7927

[21] Appl. No.: 815,017

[22] Filed: Jul. 12, 1977

[30] Foreign Application Priority Data

Jul. 14, 1976 [DE] Fed. Rep. of Germany ....... 2631583

[51] Int. Cl.² .......................................... B23B 31/16
[52] U.S. Cl. .................................................. 279/114
[58] Field of Search ............... 279/114, 115, 116, 117, 279/121, 110, 4

[56] References Cited

U.S. PATENT DOCUMENTS

| | | | |
|---|---|---|---|
| 3,656,773 | 4/1972 | Blattry et al. | 279/114 |
| 3,698,729 | 10/1972 | Scharfen et al. | 279/114 |

*Primary Examiner*—Gil Weidenfeld
*Attorney, Agent, or Firm*—Karl F. Ross

[57] ABSTRACT

A power-actuated chuck comprises a chuck body in which a plurality of chuck jaws are radially displaceable, each jaw having inclined teeth engageable by a substantially linearly displaceable wedge or camming element on the chuck body. A drive ring is connected to all of these wedge members for the joint displacement thereof and is, in turn, actuated by a tangentially displaceable slider which is shifted by an axially displaceable member connected to an axially effective piston-and-cylinder arrangement.

10 Claims, 6 Drawing Figures

POWER-ACTUATED CHUCK, ESPECIALLY FOR TURNING MACHINES SUCH AS LATHES

FIELD OF THE INVENTION

The present invention relates to a power-actuated chuck for a turning machine such as a lathe and, more particularly, to a chuck which facilitates the removal and replacement of the jaws, increases the speed of operation, and simplifies the mechanism by which the system is actuated.

BACKGROUND OF THE INVENTION

It is known to provide a power-actuated chuck for turning machines such as lathes having a chuck body provided with radially shiftable chuck jaws and wedge or camming members which are linearly displaceable, generally substantially tangentially of the chuck body, i.e. along a secant thereof, and a mechanism for actuating all of the wedge or camming members simultaneously.

Such power-actuated chucks are described, for example, in German printed application (Auslegeschrift) DT-AS No. 2,007,509. In this system, the common actuator for the wedge or camming members is a drive ring which is formed as a gear and which has external toothing engaging or meshing with oppositely extending teeth of the wedge or camming members. A torsion tube is connected to the drive gear and rotatably entrains the latter, the drive tube extending through the hollow spindle of the turning machine to the opposite end of the spindle at which the drive tube is connected to a rotary piston-cylinder arrangement. The piston vanes of the latter are connected nonrotatably with the torque tube and the cylinder housing is connected to an intermediate flange of the spindle end.

In German patent No. DT-PS 2,347,561 and in German patent No. DT-PS 2,004,889, there are described hand-actuated chucks of the aforedescribed general type in which the drive connection between the drive ring and the wedge members includes a pin for each of the wedge members. A slide block is rotatable on each pin and is radially shiftable in a respective radial groove of the drive ring.

In all of these conventional or prior-art chucks, the release of the jaws and the clamping and disengagement strokes of the latter require relatively large displacements of the actuating members such that the teeth of the wedging or camming members fully withdraw from the chuck jaws and enable the latter to be changes.

In the power actuated chuck described in German Auslegeschrift (printed application) DT-AS No. 2,007,509, mentioned earlier, however, the requirement for a rotary-piston-cylinder arrangement provides undesirably high capital expenditure because of the nature of the rotary piston and the difficulty in effectively sealing the cylinder housing. Furthermore, such units have been found to be prone to failure.

In every case, moreover, the rotary piston arrangements require special and custom-built structures for the chuck which has rendered the chuck unsatisfactory for many purposes.

Indeed it is known to provide an axial actuator for such a chuck (see German Pat. No. DT-PS 1,059,741 and German Pat. No. DT-AS 2,139,718). However, these systems do not permit rapid displacement of the actuating members. Rapid change or replacement of the chuck jaws is also not possible and hence the prior art chucks have not been found to be satisfactory for numerically controlled machine tools.

OBJECTS OF THE INVENTION

It is the principal object of the present invention to provide a power-actuated chuck which is free from the disadvantages of the earlier systems described above, while utilizing aspects thereof which have been found to be satisfactory.

Another object of the invention is to provide a power-actuated chuck which can make use of an axially effective actuating cylinder.

Still another object of this invention is to provide a chuck which is simply and reliably actuated by power and yet enables the rapid replacement of the chuck jaws and is especially satisfactory for use in numerically controlled machine tools.

SUMMARY OF THE INVENTION

These objects and others which will become apparent hereinafter are attained, in accordance with the present case, in a multiple-jaw power-actuated chuck which comprises a chuck body having an axis of rotation and, at least upon one face of this body, a plurality of angularly equispaced radially shiftable jaws. According to the invention, a common drive ring is provided for all of the jaws and is rotatable upon the chuck body and is connected to the jaws by a force-transmitting mechanism transforming angular displacement of the ring into radial displacement of the jaws.

According to this invention, there is provided a slider which is shiftable linearly in the chuck body along a path which is substantially tangential to the drive ring, the slider, in turn, being displaced by an axial shiftable member, i.e. a member connected with an axially effective piston and cylinder arrangement, this member having a plurality of wedging or camming teeth of difference inclinations for successive engagement with corresponding grooves of the slider whereby one of these teeth is effective for displacing the jaws at relatively high rate.

Of course, the slider can be formed with the teeth and the axially displaceable member with the grooves, if desired.

The teeth and the respective grooves cooperate such that, upon an axial displacement of the actuating member, there is a corresponding transverse displacement of the slider in the chuck body. This transverse displacement of the slider is effective to bring about a corresponding rotation of the drive ring, e.g. by coupling the drive ring with the slider via a pin and slide block connection.

The drive ring, in turn, is connected by a pin and slide block connection with wedge members which are toothed to effect a radial displacement of the complementarily toothed jaws in the chuck body.

Since the toothed portions of the jaws and the wedge member are in force-transmitting and form-fitting relationship, the axial displacement of the actuating member can effect a tightening or loosening of the jaws and, moreover, a displacement of the wedge members such that the teeth of the jaws are freed to enable withdrawal of the jaws and their replacement. When the teeth of the wedge members clear the teeth of the jaws, moreover, it is possible to manually position the jaws rapidly to pin against a workpiece, thereby reducing the stroke of the hydraulic device which powers the chuck.

An important advantage of the present invention is that it makes use of an axially effective piston-and-cylinder arrangement which can be of ordinary commercial availability and allows the jaws easily and rapidly to be replaced.

Because of the tooth and groove arrangement between the actuating member and the slider, I have found that it is possible to drive the slider more rapidly over a portion of the stroke of the actuating member and less rapidly over the next portion of this stroke so that the jaws can rapidly be brought into a release position but yet can be tightened with high mechanical advantage against the workpiece. The rate of displacement of the slider and hence of the drive ring and the jaws can thus be controlled by the inclination of the teeth.

It has been found to be advantageous to provide the slider, along its side turned toward the wedge members and hence the sides of the wedge members turned away from the drive ring, with a pin on which a slide block is rotatably mounted, this slide block being guided in a radial groove of the drive ring.

According to a further feature of the invention, the actuating member is coaxially shiftable in the chuck body and has a planar surface parallel to the axis thereof which rides along a parallel slide plan of the slide to prevent rotation of the actuating member relative to the chuck body. The aforementioned inclined teeth and grooves connecting the actuating member to the slider can be formed in these planar surfaces.

The coaxial arrangement of the actuating member facilitates in an especially simple manner the direct connection of the actuating member to the traction rod or tube by which the axially effective piston is connected to the chuck. The cylinder can, of course, bear against one end of the lathe spindle while the chuck is mounted on the opposite end thereof, the piston being effective through the hollow spindle.

It has been found to be desireable to connect the actuating member to the cylinder through a threaded bolt.

The two camming or wedging teeth are so offset from one another transversely and along the chuck axis that, upon axial displacement of the actuating member, one of the teeth enters the respective guide groove edges as the other tooth leaves its guide groove and vice versa, the two guide grooves being disposed adjacent one another in the direction of displacement of the slider.

The more steeply inclined tooth thus produces the high speed stroke of the jaws while the tooth inclined to a lesser extent is effected during the tightening stroke of the jaws.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
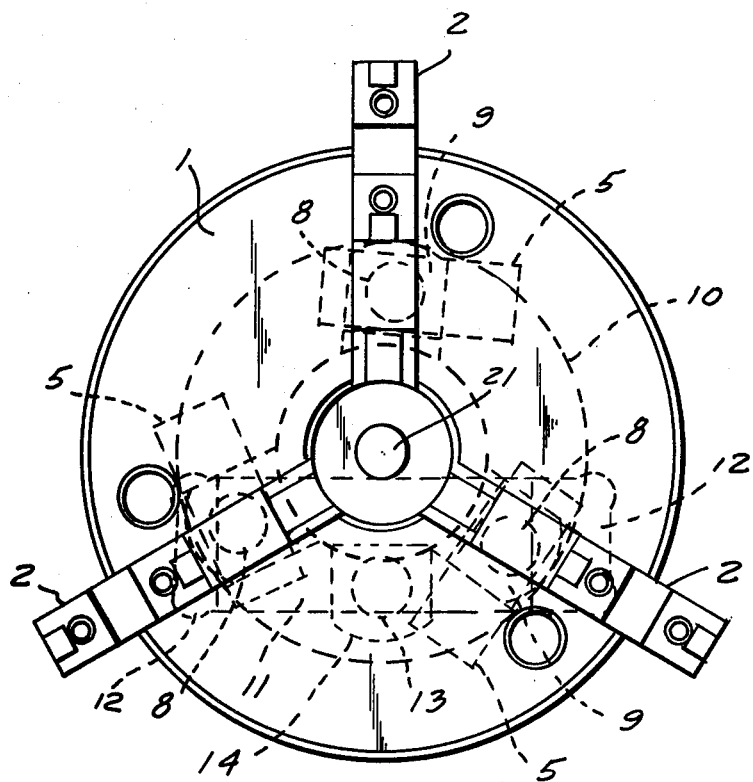
FIG. 1 is a front elevational view of the power-actuated chuck according to the invention, with the outer jaw members removed.

In the drawing I have shown a chuck body 1 which is provided with guide slots receiving three angularly equispaced chuck jaws 2, of which only the base jaw portions have been illustrated. The outer portions of the jaws, which are attached by screws to the base portions, have not been shown.

The jaws 2 are provided on their reverse sides (rear portions) with arrays of inclined teeth 3 which engage with teeth of corresponding inclination in respective wedge members 5. The latter are tangentially displaceable and because of the inclination of the respective teeth, cam or wedge the jaws 2 radially toward or away from the workpiece which is received inwardly of the jaws.

The length of the tooth array 4 corresponds substantially to the tangential displacement stroke of the wedge member 5 for tightening and loosening the jaws 2 against the workpiece (not shown).

The wedge members 5, in turn, are formed on their rear sides each with a respective pin 8 rotatable in a slide block 9 which, in turn, is shiftable in a respective radial groove 7 of a drive ring 10 journaled on the chuck body 1 for rotation about the axis thereof. The drive ring 10 thus forms the common drive element for all of the wedge members 5 and hence for all of the jaws. When the drive ring 10 is angularly displaced relative to the chuck body 1, depending upon the angular displacement sense, the wedge members 5 are correspondingly shifted tangentially and thus the respective jaws 2 are radially displaced.

The drive ring 10 and the wedge members 5 are displaceable beyond the necessary stroke for loosening and tightening the jaws 2 against the workpiece and into positions in which the tooth array 4 of each wedge member 5 is full withdrawn from meshing engagement with the teeth 3 on the respective jaw 2. In this position each jaw 2 can be radially withdrawn from its guide channel or slot for replacement, or can merely be advanced toward the workpiece to set the chuck prior to tightening.

To drive the ring 10, I provide the chuck body 1 with a slider 11 which is guided in a groove 12 formed in the chuck body, the groove 12 lying substantially tangentially to the drive ring 10. The slider 11 is thus shiftable substantially tengentially to the drive ring and engages the latter.

To this end, the slider 11 is provided on the side thereof turned toward the front or face of the chuck and hence toward the side of the drive ring 10 turned away from the wedge members 5, with an axially extending pin 13 which is rotatable in a slide block 14. The slide block 14 is shiftable in a radial groove 15 of the drive ring 10.

Thus, when the slider 11 is linearly shifted in either longitudinal direction, it entrains the slide block 14 in a corresponding direction and the slide block 14 entrains the drive ring 10 in the corresponding angular sense.

For displacement of the slider 11, the chuck body 1 is formed with an axially shiftable member 16, e.g. a bar, which can be operated by an axially effective hydraulic-piston-and-cylinder arrangement not shown in the drawing.

Figure 2:
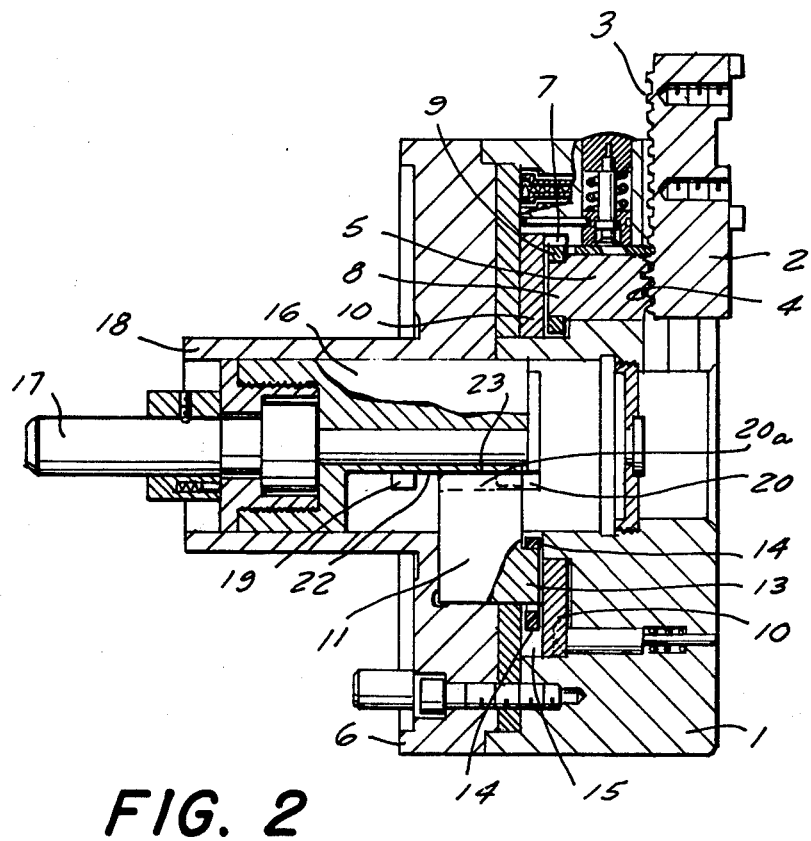
FIG. 2 is an axial cross-sectional view through the chuck of FIG. 1.

To this end, a threaded bolt 17 can be provided, the threaded end reaching to the left in FIG. 2 and being engageable with the piston rod of the piston-and-cylinder arrangement described above. The bolt 17 is formed with a shoulder which is clamped by a threaded bushing against the axially displaceable member or bar 16 mentioned above. Thus, a displacement of the bolt 17 to the left will draw the axially displaceable bar 16 in this direction while a displacement of the bolt 17 in the opposite direction will correspondingly displace the bar 16.

Members 16 and 17 may be made hollow or tubular and can be connected to a hollow lathe spindle, not shown, provided with the axially displaceable connected to the axially effective cylinder arrangement. Alternatively, the axially effective piston arrangement can be connected to the threaded end of bolt 17 through the hollow lathe spindle.

The chuck body 1 has a flange 6 having an axially extending tubular boss 18 which forms a guide for the axially displaceable bar 16 and, in addition, enables the chuck to be mounted upon the head of the lathe spindle or upon the headstock of the lathe.

The axially displaceable member is connected with the slider 11, in the embodiment illustrated in the drawing, by a pair of wedging or camming teeth 19 and 20. The camming teeth 19 and 20 are inclined relative to the chuck axis 21 in the direction of displacement of the slider 11.

Each of the teeth 19 and 20 is receivable in a respective guide groove 19a, 20a so that the force transmission between the members 16 and the slider 11 is effective in both directions of the slider displacement.

The axially displaceable member 16 has a planar surface 22 which rests against the slider surface 23 to prevent rotation of the member 16 relative to the chuck body. The teeth 19 and 20 project from the surface 22 while the grooves 19a and 20a are formed in the surface 23. Naturally, member 16 can be provided with the grooves and member 11 with the teeth in a kinematic reversal of this drive structure.

Figure 6:
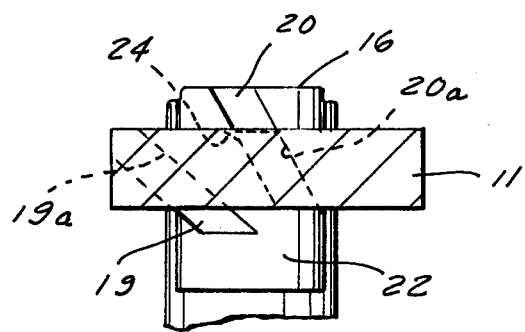
FIG. 6 is a view of the structure shown in FIG. 5 in the position of the axially displaceable member and slide in the transition between the working stroke to the rapid-displacement stroke.
Figure 3:
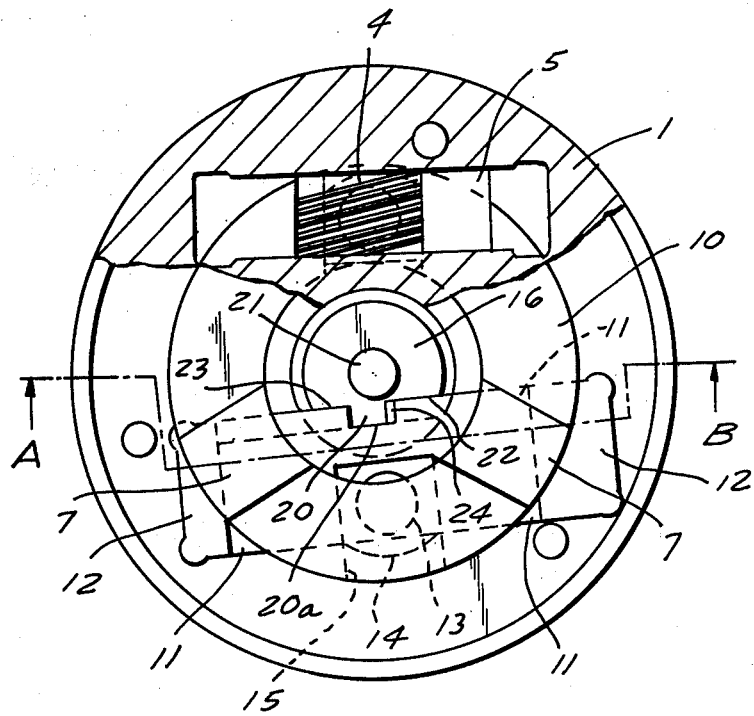
FIG. 3 is a section through a portion of the chuck illustrated in FIG. 1 taken in a plane perpendicular to the axis thereof.

The two camming teeth 19 and 20 differ in the extent of their inclination or pitch and are so offset from one another transversally and along the chuck axis 21, that upon axial displacement of the member 16 the tooth 19 passes out of the associated groove 19a as shown in FIG. 6, the other tooth 20 enters the associated groove 20a in the slider 11 and vice versa.

Thus, both guide grooves 19a and 20a are disposed adjacent one another in the direction of displacement of the slider 11.

Figure 4:
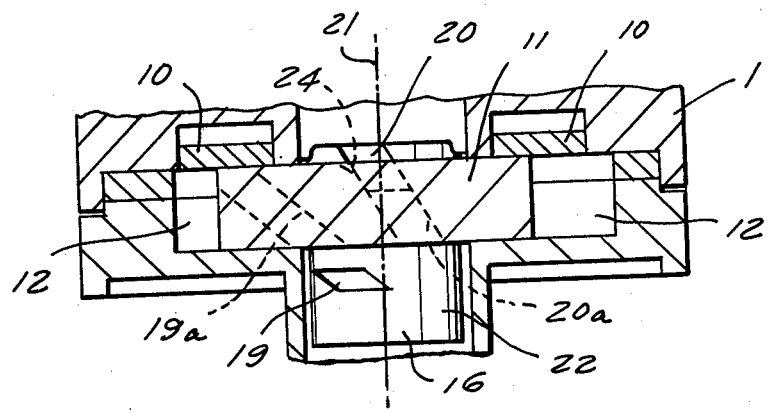
FIG. 4 is a section taken along the line A - B of FIG. 3.

In effect, the more inclined camming tooth 19 effects a rapid displacement of the wedge member 5 while the less inclined tooth 20 carries out the tightening stroke. As can be seen from FIG. 4 the slider 11 is engaged by the tooth 20 of the axially displaceable member 16 corresponding to the tightening stroke.

FIG. 6 shows the transition from the tightening stroke to the rapid-operation stroke when the tooth 19 becomes effective. Just before this position, as can be seen in FIG. 6, the jaws 2 are briefly decoupled from member 16 but the wedge members 5 are not yet sufficiently displaced to disengage their teeth 4 from the teeth 3 of the jaws 2. The jaws 2 can, therefore, both be removed.

Figure 5:
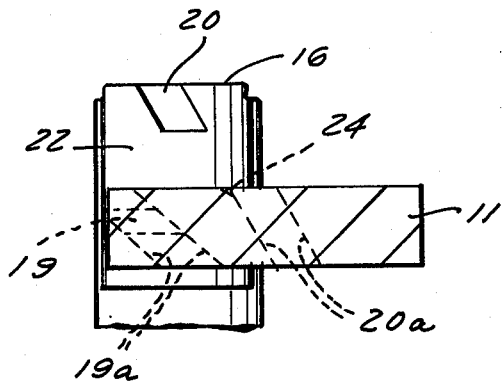
FIG. 5 is a detail view showing a portion of the structure of FIG. 4 drawn to an enlarged scale in the position of the axially displaceable member and tangentially shiftable slide in which removal and replacement of the jaws is possible.

The further displacement of the wedge members 5 to release the jaws is effected by means of the rapid-operation stroke in the position of slider 11 corresponding to FIG. 5. Here the tooth 19 is fully effected.

The rapid-operation stroke also works in the reverse sense to close the jaws quickly upon the workpiece until the tooth 20 becomes effected and thereupon increase the force, decrease the rate of displacement and apply the jaws in the tightening stroke.

To facilitate the transition between the rapid-operation and tightening engagements of the teeth 19 and 20 in the respective grooves, the grooves can be provided at their entry ends with inclined surfaces such as represented at 24 to widen slightly the respective grooves.

I claim:

1. A power-actuated chuck for a turning machine, comprising:
   a chuck body rotatable about an axis;
   a plurality of jaws angularly spaced about said axis and radially displaceable on said body to engage and disengage a workpiece received between said jaws;
   a drive ring rotatable on said body;
   mechanism connecting a said drive ring and said jaws for transforming angular displacement of said drive ring into radial displacement of said jaws;
   an actuating member axially displaceable on said body and connectible to an axially effective piston-and-cylinder arrangement;
   a slider member displaceable on said jaw generally tangentially with respect to said ring and operatively connected thereto for angularly displacing said ring upon linear displacement of said slider member, one of said members being formed with a tooth inclined to said axis and the other of said members being formed with a groove receiving said tooth whereby axial displacement of said actuating member linearly shifts said slider member.

2. The chuck defined in claim 1 wherein said mechanism comprises:
   an array of teeth formed on each of said jaws and inclined to the respective radius;
   a respective wedging element formed with an array of complementary teeth engaging the teeth of each of said jaws, said wedging elements being each shiftable generally transverse to said axis; and
   means connecting each of said elements with said ring for displacement of said elements by said ring.

3. The chuck defined in claim 2 wherein said slider member, is disposed along the side of said ring turned away from said elements.

4. The chuck defined in claim 3 wherein said slider member is formed with a pin carrying a slide block rotatably thereon and said ring is formed with a radial groove slidably receiving said block.

5. The chuck defined in claim 3 wherein said actuating member is disposed coaxially in said jaw and has an axially extending planar surface slidably engaging a planar surface of said slider member whereby rotation of said actuating member relative to said body is prevented, said tooth projecting from one of said surfaces and said groove being recessed in the other surface.

6. The chuck defined in claim 3 wherein said tooth is formed on said actuating member and said groove is formed in said slider member.

7. The chuck defined in claim 3 wherein two such inclined teeth are provided on said one of said members, said tooth of said members being formed with respective grooves adapted to receive said teeth, one of said grooves and the corresponding tooth having a greater inclination than the other groove and corresponding tooth.

8. The chuck defined in claim 7 wherein said teeth are offset from one another along said axis and transversely thereto such that, upon axial displacement of said actuating member, one of said teeth just withdraws from the corresponding groove as the other of said teeth enters its corresponding groove.

9. The chuck defined in claim 8 wherein said teeth and said grooves are so dimensioned and arranged to impart to said elements a high speed displacement enabling withdrawal of the teeth of each element from the teeth of the respective jaw whereby said teeth can be withdrawn from said jaw and replaced.

10. The chuck defined in claim 9 wherein said elements are each formed with a respective pin carrying a slide block rotatable thereon, said ring being formed with respective radial grooves receiving said slide blocks.

* * * * *